(12) United States Patent
Sharma

(10) Patent No.: US 10,015,625 B2
(45) Date of Patent: Jul. 3, 2018

(54) PROVIDING DIGITAL CONTENT FOR OFFLINE CONSUMPTION

(71) Applicant: Flipboard, Inc., Palo Alto, CA (US)

(72) Inventor: Vaibhav Sharma, Mountain View, CA (US)

(73) Assignee: Flipboard, Inc., Palo Alto, CA (US)

( * ) Notice: Subject to any disclaimer, the term of this patent is extended or adjusted under 35 U.S.C. 154(b) by 367 days.

(21) Appl. No.: 14/620,171

(22) Filed: Feb. 11, 2015

(65) Prior Publication Data

US 2016/0234290 A1   Aug. 11, 2016

(51) Int. Cl.
| | |
|---|---|
| *G06F 15/16* | (2006.01) |
| *H04W 4/02* | (2018.01) |
| *H04L 12/26* | (2006.01) |
| *H04L 12/24* | (2006.01) |
| *H04L 29/08* | (2006.01) |

(52) U.S. Cl.
CPC .............. *H04W 4/02* (2013.01); *H04L 41/147* (2013.01); *H04L 43/0894* (2013.01); *H04L 67/18* (2013.01); *H04L 67/306* (2013.01)

(58) Field of Classification Search
CPC ... H04L 67/06; H04L 41/147; H04L 43/0894; H04L 67/2842; H04W 4/02
USPC .......................................................... 709/219
See application file for complete search history.

(56) References Cited

U.S. PATENT DOCUMENTS

| | | | |
|---|---|---|---|
| 8,811,172 B1 * | 8/2014 | Sella ....................... H04L 41/12 370/227 |
| 2008/0120670 A1 | 5/2008 | Easton et al. | |
| 2008/0120870 A1 * | 5/2008 | Sussmann ............... A43B 13/20 36/88 |
| 2009/0006308 A1 * | 1/2009 | Fonsen ............. G06F 17/30902 |
| 2009/0100127 A1 * | 4/2009 | Dasgupta .......... G06F 17/30132 709/203 |
| 2009/0138357 A1 * | 5/2009 | Riggs ..................... G06Q 30/02 705/14.52 |
| 2013/0024757 A1 | 1/2013 | Doll et al. | |

(Continued)

OTHER PUBLICATIONS

PCT International Search Report and Written Opinion for PCT/US2016/016010, dated Apr. 11, 2016, 19 Pages.

(Continued)

*Primary Examiner* — Tauqir Hussain

(74) *Attorney, Agent, or Firm* — Fenwick & West LLP

(57) ABSTRACT

A digital magazine application executing on a client device presents digital content to a user. Historical connectivity data describing connectivity between the client device and a network is obtained and is used to determine a predicted disconnection time indicating an anticipated loss of connectivity between the client device and the network. The historical connectivity is also used to determine a preload time prior to the predicted disconnection time. Content selected by the digital magazine server is communicated to the client device at the determined preload time for storage by the client device. Content may be selected for transmission based on attributes of content previously requested when the connection between the client device and network has less than a threshold bandwidth. At the preload time, for example, the client device requests a section of a digital magazine associated with content previously requested at times of low-bandwidth network connectivity.

16 Claims, 5 Drawing Sheets

(56) References Cited

U.S. PATENT DOCUMENTS

| | | |
|---|---|---|
| 2013/0238761 A1* | 9/2013 | Raleigh ................ H04L 67/306 709/219 |
| 2014/0074863 A1 | 3/2014 | Walkingshaw et al. |
| 2014/0075275 A1* | 3/2014 | Aleksandrovsky . G06F 17/2229 715/202 |
| 2014/0215063 A1* | 7/2014 | Krishnamurthy ...... G06Q 10/10 709/224 |
| 2015/0019943 A1 | 1/2015 | Ying et al. |
| 2015/0019957 A1 | 1/2015 | Ying et al. |
| 2015/0019958 A1 | 1/2015 | Ying et al. |

OTHER PUBLICATIONS

Flipboard "Good News for Commuters: Mobile Data Options", Inside Flipboard, Mar. 22, 2013, 6 pages, [Online], [Retrieved Apr. 20, 2015], Retrieved from the Internet, < https://about.flipboard.com/inside-flipboard/good-news-for-commuters-mobile-data-options/ >.

* cited by examiner

PROVIDING DIGITAL CONTENT FOR OFFLINE CONSUMPTION

BACKGROUND

This disclosure relates generally to providing digital content to a client device, and in particular to providing digital content to the client device for consumption while the client device has limited or no network connectivity.

Client devices, such as mobile devices, retrieve digital content from various sources through a network for presentation to a user. Mobile devices are popular client devices for accessing digital content because of their ease of use and portability. This portability exposes the mobile devices to different locations having different connectivity to network resources. When a mobile device is in a location with impaired network connectivity, the mobile device cannot access digital content for presentation to the user.

To provide offline access to digital content, a conventional mobile device may retrieve and store digital content while connected to a network, allowing a user to access the stored digital content when the mobile device is disconnected from the network. Because the mobile device retrieves the digital content while connected to the network, the stored digital content is necessarily older, and therefore less relevant, when the mobile device is subsequently disconnected form the network than digital content available if the mobile device had a connection to the network. To provide more recent digital content for offline consumption, a mobile device may frequently retrieve digital content when the mobile device has at least a threshold level of connectivity with a network. However, frequent retrieval of digital content increases power consumption by the mobile device, which more rapidly drains the mobile device's battery. Additionally, frequently retrieving digital content may increase consumption of data allocated to a user by a network carrier or other service provider, which may cause the user to incur additional charges by the network carrier or service provider.

SUMMARY

An application executing on a client device, such as a mobile device, displays digital content obtained from one or more sources to a user. To increase availability of recent, relevant content provided by the application through varying levels of connectivity between the client device and the sources through a network, the client device preloads content from one or more sources accessed via the network into local storage prior to an anticipated loss of connectivity to the network. The client device preloads the content into local storage at a preload time that occurs before a predicted disconnection time corresponding to an anticipated loss of connectivity to the network by the client device. To determine the predicted disconnection time, historical connectivity data describing previous losses of connectivity between the client device and the network is obtained. For example, a loss of connectivity between the client device and the network occurs when a connection strength of a wireless connection between the client device and the network has less than a threshold value. In some embodiments, a source of content determines a predicted disconnection time by ranking previous times when the client device had less than a threshold level of connectivity to the network ("disconnection times") within a recurring period of time. For example, a predicted disconnection time for weekday afternoons is a time after which a threshold number or percentage (e.g., fifty percent of losses of connectivity) occur on weekday afternoons. At a preload time prior to the predicted disconnection time, the source of content selects and communicates content to the client device. Alternatively, the client device determines the predicted disconnection time and communicates a request for content to a source at the preload time that is prior to the predicted disconnection time.

In one embodiment, the application executing on the mobile device is a digital magazine application displaying a digital magazine including content items for presentation to a user. To generate the digital magazine, a digital magazine server organizes content items having at least one common attribute into various sections, and presents content items to the user according to the sections. The digital magazine server selects content for transmission to the client device at a preload time based on previous content requested by a user of the client device. For example, a user consistently requests content associated included in a section of the digital magazine within a threshold time interval of a predicted disconnection time or a preload time, so the digital magazine server transmits additional content included in the section to the client device at the preload time.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, a tablet, or any other suitable computing system) and presented to the user. For example, based on selections made by the user and/or on behalf of the user, the digital magazine server generates a digital magazine including one or more sections including content items retrieved from a number of sources and personalized for the user. The generated digital magazine allows the user to more easily consume content that interests and inspires the user by presenting content items in an easily navigable interface via a mobile computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
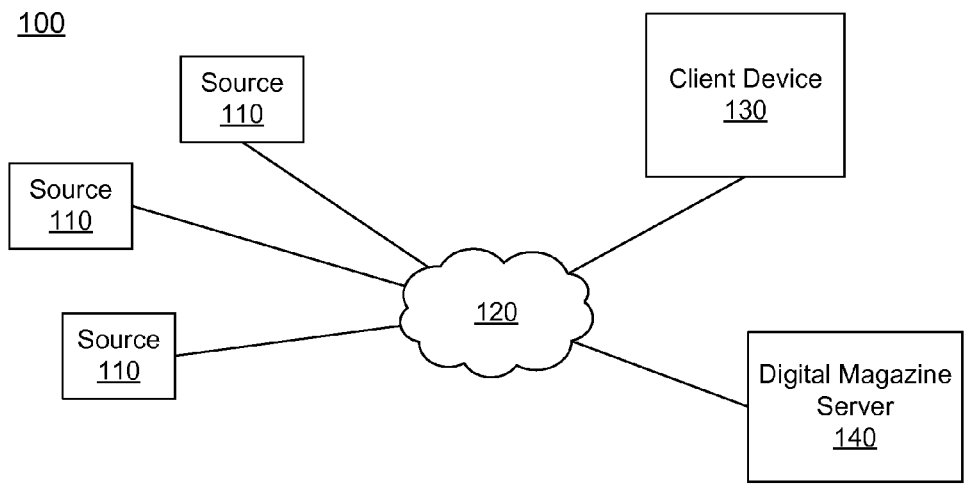
FIG. 1 is a block diagram of a system environment in which a digital magazine server operates, according to one embodiment.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. The client device 130 is a device having computer functionality, such as a personal digital assistant (PDA), a mobile telephone, a smartphone, or another suitable device, which allows users to interact with the digital magazine server 140. The client device 130 retrieves pages of content from the digital magazine server 140 in response to user inputs received at the client device 130.

In one embodiment, the client device 130 monitors connectivity between the client device 130 and the network 120. Connectivity refers to the capacity of the client device 130 to send and to receive information through the network 120 subject to specified conditions on connectivity characteristics, which describe connectivity between the client device 130 and the network 120. Example connectivity characteristics include bandwidth (e.g., data download speed, data upload speed), reliability of connectivity (e.g., percentage of time within a sliding window when bandwidth exceeds a threshold), and connectivity type (e.g., 4G, WiFi). A loss of connectivity occurs when connectivity characteristics do not satisfy the specified conditions on connectivity characteristics. To provide content to a user before a loss of connectivity occurs, the client device 130 is provided with content by the digital magazine server 140 prior to a predicted disconnection time when the client device 130 is likely to incur a loss of connectivity to the network 120. A client device 130 provided with content before an anticipated loss of connectivity is further described in conjunction with FIG. 3 and providing content to the client device is further described below in conjunction with FIG. 5. While FIG. 1 shows a single client device 130, in various embodiments, any number of mobile devices 130 may communicate with the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
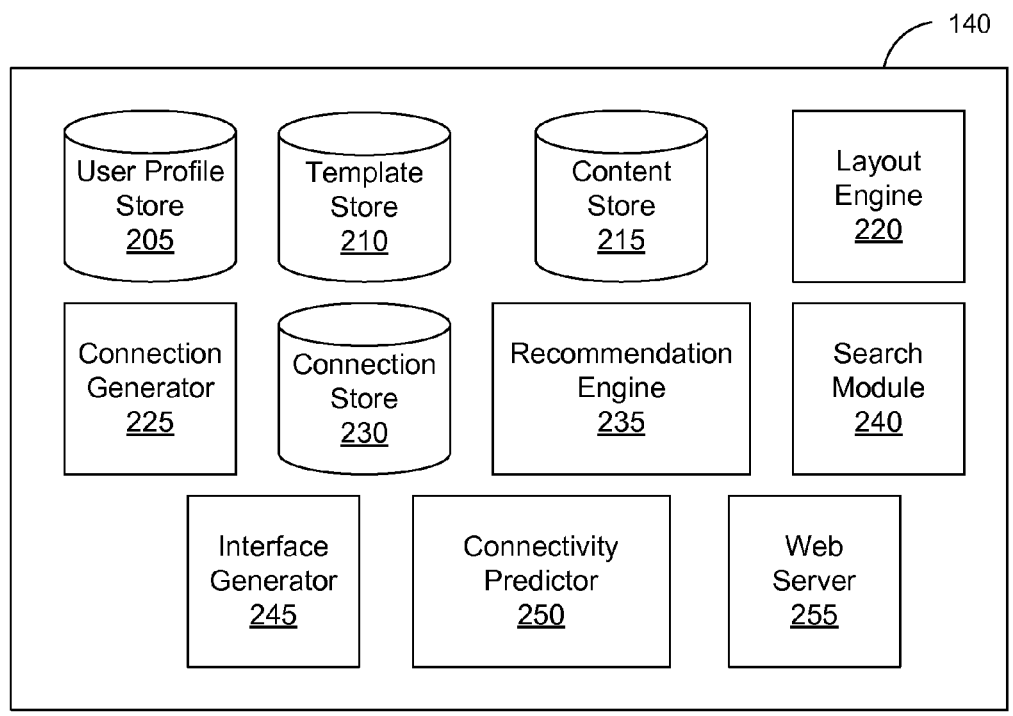
FIG. 2 is a block diagram of a digital magazine server, according to one embodiment.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, a connectivity predictor 250, and a web server 255. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred. A user profile in the user profile store 205 may also include historical connectivity data describing connectivity of one or more client devices 130 associated with a user. The historical connectivity data includes times and/or geographical locations of changes in connectivity (e.g., loss of connectivity, reestablishment of connectivity) between the one or more client device 130 associated with the user and a network 120. Historical connectivity data may also describe connectivity characteristics (e.g., bandwidth, type, reliability) while a client device 130 has connectivity.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products, or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, and U.S. patent application Ser. No. 13/938,227, filed on Jul. 9, 2013, each of which is hereby incorporated by reference in its entirety.

The content store 215 stores objects that each represent various types of content. For example, the content store 215 stores content items received from one or more sources 115 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content store 215 store along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. Examples of using a page template to present content items are further described in U.S. patent application Ser. No. 13/187,840, filed on Jul. 21, 2011, U.S. patent application Ser. No. 13/938,223, filed on Jul. 9, 2013, and U.S. patent application Ser. No. 13/938,226, filed on Jul. 9, 2013, each of which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a user and an additional user by analyzing the user's interactions with content items posted by the additional user, whether the content items are presented using the digital magazine server 140 or using another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

In one embodiment, the recommendation engine 235 selects content items for transmission to the client device 130 upon receiving an indication of an anticipated lapse of connectivity to a network 120 by the client device 130. In one embodiment, the recommendation engine 235 selects content items for communication to the client device 130 based at least in part on content presented to the user during a threshold time period before a time when the client device 130 is anticipated to have a lapse of connectivity to a network 120 (a "predicted disconnection time"). For example, the recommendation engine 235 selects content items for transmission to the client device 130 that have at least a threshold number of attributes in common with content items presented to a user during a time period before the predicted disconnection time. As another example, the recommendation engine 235 selects content items having an implicit connection with at least a threshold weight to a content item presented to the user during the time period before the predicted disconnection time.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 240 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 240 may present identified content items based on a ranking. One or more factors associated with the content items may be used to generate the ranking Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device of a client device 130 with modifications to content presented by a digital magazine. As an example, if the input device is a touch-sensitive display, the interface generator 245 includes instructions associating different touch gestures with navigation through content items presented via a digital magazine. As another example, the input device is a location sensor, and the interface generator 245 includes instructions to display a prompt through which the user may request retrieval of content items prior to an anticipated loss of connectivity. Instructions from the interface generator 245 are communicated to a digital magazine application or other application executing on a client device 130 on which content from the digital magazine server 140 is presented. Inputs received via an input device of the client device 130 are processed based on the instructions when content items are presented via the digital magazine server 140 is presented to simplify user interaction with content presented by the digital magazine server 140.

The connectivity predictor 250 obtains historical connectivity data associated with a client device 130 and determines one or more times when the client device 130 is likely to have less than a threshold level of connectivity with a network (one or more "predicted disconnection times") based on the historical connectivity data. In some embodiments, the connectivity predictor 250 also determines a preload time for communicating content to the client device 130 prior to a predicted disconnection time. The connectivity predictor 250 may determine a predicted disconnection time and/or a preload time based on a percentile of disconnection times described by the historical connectivity data. For example, the predicted disconnection time is an average of disconnection times during a periodic time range (e.g., weekday mornings, weekday evenings), and the preload time is determined to be a time after which a threshold percentage (e.g., ninety-five percent) of losses of connectivity within the periodic time range occur. In one embodiment, the preload time is based on the predicted disconnect time. For example, the preload time is a threshold time interval before the predicted disconnect time. In one embodiment, the connectivity predictor 250 determines the predicted disconnection time and/or the preload time based on a location of the client device 130. For example, the preload time occurs when the client device 130 is within a threshold distance of a geographic location associated with a previous loss of connectivity by the client device 130. In some embodiments, content selected by the recommendation engine 235 for the user is transmitted to the user's client device 130 from the digital magazine server 140 at the preload time. Alternatively, the digital magazine server 140 communicates a notification to the user's client device 130 to request additional content at the preload time, and the digital magazine server 140 transmits content to the user's client device 130 if the digital magazine server 140 receives a request for additional content.

The web server 255 links the digital magazine server 140 via the network 120 to the one or more client devices 130, as well as to the one or more sources 110. The web server 255 serves web pages, as well as other content, such as JAVA®, FLASH®, XML and so forth. The web server 255 may retrieve content item from one or more sources 110. Additionally, the web server 255 communicates instructions for generating pages of content items from the layout engine 220 and instructions for processing received input from the interface generator 245 to a client device 130 for presentation to a user. The web server 255 also receives requests for content or other information from a client device 130 and communicates the request or information to components of the digital magazine server 140 to perform corresponding actions. Additionally, the web server 255 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, while the connectivity predictor 250 is described above as determining a predicted disconnection time, a preload time, and selecting content for transmission to the client device 130 at the preload time, in other embodiments the client device 130 may determine the predicted disconnection time or the preload time and/or identify content to request at the preload time.

Client Device Architecture

Figure 3:
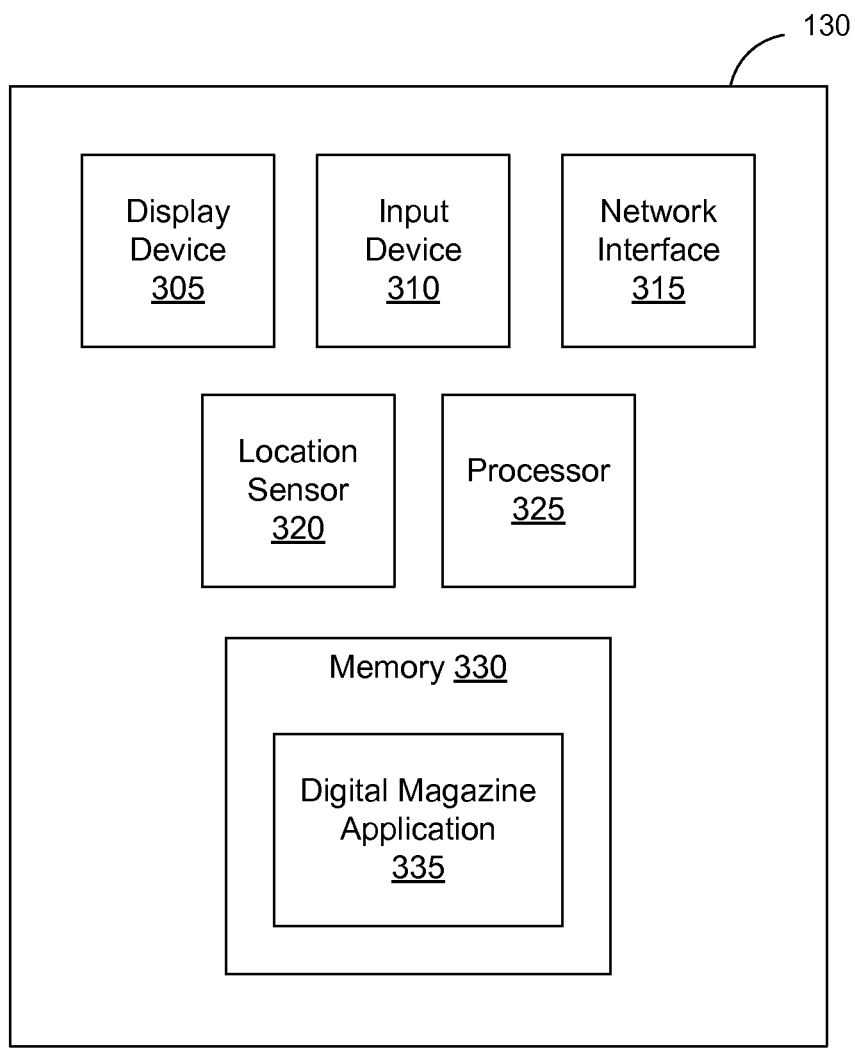
FIG. 3 is a block diagram illustrating components of a client device, according to one embodiment.

As described above in connection with FIG. 1, the client device 130 retrieves content from the digital magazine server 140 and presents the content to a user. As the user interacts with the digital magazine content, the client device 130 receives inputs to navigate the digital magazine content or to communicate with the digital magazine server 140. FIG. 3 is a block diagram of one embodiment of the client device 130. The example client device 130 shown in FIG. 3 includes a display device 305, an input device 310, a network interface 315, a location sensor 320, a processor 325, and a memory 330. Other embodiments of the client device 130 may include different and/or additional components than those described in conjunction with FIG. 3.

The display device 305 presents content items to a user of the client device 130. Examples of the display device 305 include a liquid crystal display (LCD), an organic light emitting diode (OLED) display, an active matrix liquid crystal display (AMLCD), or any other suitable device. Different client devices 130 may have display devices 305 with different characteristics. For example, different client devices 130 have display devices 305 with different display areas, different resolutions, or differences in other characteristics.

The input device 310 receives input from the user. Different input devices 310 may be included in the client device 130. For example, the client device 130 includes a touch-sensitive display for receiving input data, commands, or information from a user. In some embodiments, the client device 130 includes a touch-sensitive display, which functions as a display device 305 and an input device 310. In other embodiments, the client device 130 may include a keyboard, a trackpad, a mouse, or any other device capable of receiving input from a user. In another example, the input device 310 is configured to receive information from a user of the client device 130 through a touchless interface. Examples of a touchless interface include sensors, such as an image capture device, to receive gestures from a mobile device user without the user physically contacting the display device 305 or the client device 130. Additionally, the client device 130 may include multiple input devices 310 in some embodiments.

The network interface 315 provides connectivity between the client device 130 and the network 120. The network interface 315 may comprise one or more antennas (e.g., wireless local area network, wireless, cellular, BLUETOOTH®) for wireless communication and supporting electronic circuitry to drive the antennas and to detect information received through the antennas. The network interface 315 may also include ports (e.g., Universal Serial Bus (USB), Ethernet) for wired communication and supporting electronic circuitry. In some embodiments, the client device 130 selects between different connections of the network interface 315 to reduce power consumption or bandwidth usage. For example, the client device 130 communicates with the network 120 through antennas for communicating with a wireless local area network rather than through antennas for communicating through a cellular network if connectivity is available through both types of networks.

The location sensor 320 determines a geographic location of the client device 130. For example, a location sensor 320 is a Global Positioning System (GPS) unit. In some embodiments, the location sensor 320 determines the geographic location of the client device 130 from the connectivity of the client device 130 through the network interface 320. For example, the location sensor 320 determines the geographic location of the client device 130 by triangulation from cellular network towers at known geographic locations. As another example, the location sensor 320 determines the position of the client device 130 by identifying a wireless access point, such as a router, with which the network interface 320 has at least a threshold connection strength and determines the geographic location of the client device 130 based on a geographic location associated with the wireless access point (e.g., based on a geographic location associated with a media access control (MAC) address of the wireless access point).

Figure 4:
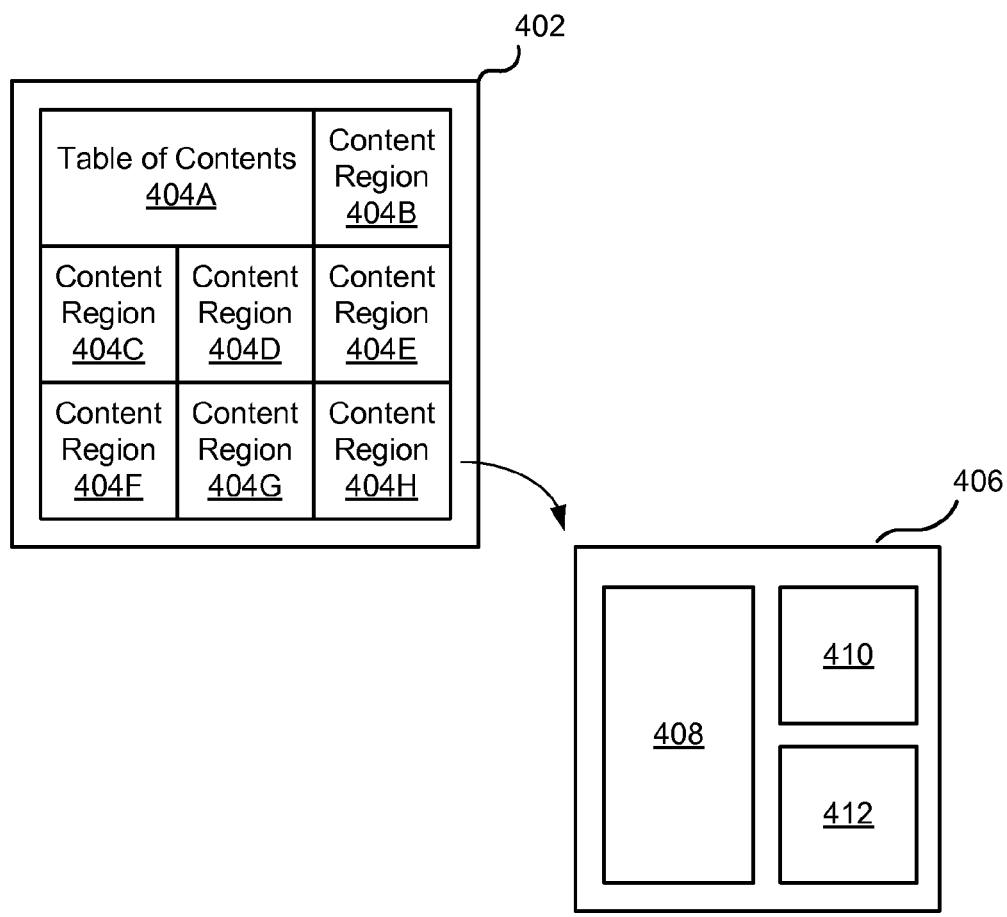
FIG. 4 is an example of presentation of content items in a digital magazine using a page template, according to one embodiment.

The processor 325 is a hardware component that retrieves and executes instructions, and outputs processed data as a result of executing the instructions. Examples of the processor 325 include: a central processing unit (CPU), a graphics processing unit (GPU), a microcontroller, a field programmable gate array (FPGA), or an application specific integrated circuit (ASIC). Although a single processor 325 is shown in FIG. 4, the client device 130 may include multiple processors 325. Furthermore, the processor 325 may include more than one processing core to increase the capacity and speed of data processing.

The memory 330 stores instructions and data used by the processor 325. In particular, the memory 330 stores instructions that, when executed by the processor 325, perform various functions allowing users to view and interact with content provided by the digital magazine server 140. In one embodiment, the instructions executable by the processor 325 and stored in the memory 330 include instructions for a digital magazine application 335, which executes on an operating system of the client device 130 (e.g., IOS®, ANDROID™). In another embodiment, the instructions include instructions for a browser, which retrieves content from the digital magazine server 140 and presents the content to a user of the client device 130. In this case, the browser implements the functionality of the digital magazine application 335 described herein. The memory 330 includes content obtained by the digital magazine application 335 prior to a time when there is at least a threshold likelihood of the client device 130 losing connectivity to a network 120, allowing the digital magazine application 335 to provide the obtained content to the user if connectivity between the client device 130 and the network 120 is lost.

The digital magazine application 335 allows a user of the client device 130 to interact with the digital magazine server 140 by receiving content from the digital magazine server 140 and presenting the received content to a user of the client device 130 via the display device 305. Inputs received via the input device 310, the network interface 315, or the location sensor 320 are processed based on instructions included in the digital magazine application 335 to identify one or more commands. Based on the identified commands, the digital magazine application 335 communicates instructions or requests for content items to the digital magazine server 140 to modify content presented to a user of the client device 130.

In one embodiment, the digital magazine application 335 monitors connectivity between the client device 130 and the network 120 through information received from the network interface 315. When a change in connectivity (e.g., a loss of connectivity, reestablishment of connectivity) occurs, the digital magazine application 335 records historical connectivity data describing the change in connectivity data. For example, the historical connectivity data includes the time and geographic location of the change in connectivity between the client device 130 and the network 120. The historical connectivity data may also identify a type of change in connectivity between the client device 130 and the network 120 to indicate whether a stored time or geographic location corresponds to a loss of connectivity or an establishment of connectivity. The digital magazine application 335 determines whether the client device 130 is connected to a network 120 by obtaining connectivity characteristics (e.g., bandwidth, connection type, connection reliability) from the network interface 315. These connectivity characteristics are compared to specified conditions for connectivity to determine whether the client device 130 is connected to a network 120. For example, the digital magazine application 335 determines the client device 130 is connected to a network 120 when bandwidth of a connection between the client device 130 and a network 120 exceeds a threshold, when a connection between the client device 130 and a network 120 has a specific type, when a connection reliability (e.g., percentage of time above a threshold bandwidth over a sliding time window before a current time) of a connection between the client device 130 and a network 120 exceeds a threshold reliability, or a combination thereof. Besides identifying changes in connectivity between the client device 130 and a network 130, the historical connectivity data may also include connectivity characteristics at times when connectivity between the client device 130 and a network 120 is unchanged. In one embodiment, the digital magazine application 335 sends historical connectivity data to the digital magazine server 140 for storage in a user profile associated with the user of the client device 130. The digital magazine application 335 includes user privacy settings to allow the user to enable, to disable, or to otherwise regulate the collection of historical connectivity data by the digital magazine application 335.

The digital magazine application 335 obtains a preload time for retrieving content from the digital magazine server 140. Alternatively, the digital magazine application 335 determines the preload time based on historical connectivity data received from the network interface 320. Determining the preload time is further described below in conjunction with FIG. 5. At the preload time, the digital magazine application 335 requests, receives, or retrieves content from the digital magazine server 140. The content from the digital magazine server 140 is stored in the memory 330 for subsequent retrieval by the digital magazine application 335 when content from the digital magazine server 140 is not available because of a lack of connectivity between the client device 130 and a network 120. In one embodiment, the digital magazine application 335 includes preload settings allowing a user to specify a recurring preload time. For example, the user specifies a pre-commute preload time for weekday mornings and a post-work preload time for late weekday afternoons. In one embodiment, the digital magazine application 335 includes an interface component (e.g., a preload button rendered as part of an interface presented by the digital magazine application 335) presented to a user, allowing the user to manually request preloading of content from the digital magazine server 140. For example, the preload time is identified as a time when the user selects a preload button presented by the digital magazine application 335.

At the preload time, the digital magazine application 335 receives content selected by the digital magazine server 140 from the digital magazine server 140. In some embodiments, the digital magazine application 335 receives from the digital magazine server 140 that is associated with specific sources 110. For example, the user configures one or more preload settings to request content associated with one or more sources 110 at preload times. As an example, the user requests content from a particular source 110, requests content from a particular cover page of a digital magazine, requests content from a particular section of a digital magazine, requests content from a particular subsection of the digital magazine, or requests content relevant to a user-specified search query. In some embodiments, the digital magazine application 335 identifies a section (or subsection) of the digital magazine to request based on content requests by the user during a prior time interval when the client device 130 lacked connectivity with a network 120. Selecting content to request at the preload time is further described below in conjunction with FIG. 5. In some embodiments, the digital magazine application 335 identifies an amount of storage available for content on the client device 130 (e.g., a total amount of available storage in the memory 330 allocated to the digital magazine application 335, an amount of storage in the memory 330 available for a section of the digital magazine) and communicates information identifying the amount of available storage to the digital magazine server 140 to determine an amount of content to transmit to the client device 130.

The digital magazine application 335 may determine a current geographic location of the client device 130 (e.g., by querying the location sensor 320). In some embodiments, the current geographic location of the client device 130 is transmitted to the digital magazine server 140 to determine a preload time. For example, the digital magazine application 335 obtains previous geographic locations where a loss of connectivity has occurred from the network interface 320, from the digital magazine server 140, from the memory 330, or from another suitable source. In response to determining that the client device 130 is within a threshold distance of a geographic location where a loss of connectivity has occurred, the digital magazine application 335 determines a current time as a preload time and requests content from the digital magazine server 140.

In some embodiments, the digital magazine application 335 prompts the user to request content from the digital magazine server 140 within a threshold interval of a preload time. For example, the digital magazine application 335 communicates content to the display device 305 to present a button or other interface element that the user may select (with the input device 310) to cause the client device 130 to request content from the digital magazine server 140. The digital magazine application 335 may also prompt the user to configure one or more preload settings identifying a preload time or a section of the digital magazine to request at a preload time. The preload settings may also identify conditions on connectivity characteristics. For example, preload settings are configured that allow the digital magazine application 335 to access cellular networks, but to identify less than a threshold strength of connection to a wireless local area network as a loss of network connectivity when determining a preload time.

Page Templates

FIG. 4 illustrates an example page template 402 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 4, when a digital magazine server 140 generates a page for presentation to a user, the digital magazine server 140 populates slots in a page template 402 with content items. Information identifying the page template 402 and associations between content items and slots in the page template 402 is stored and used to generate the page. For example, to present a page to a user, the layout engine 220 identifies the page template 102 from the template store 210 and retrieves content items from one or more sources 110 or from the content store 215. The layout engine 220 generates data or instructions associating content items with slots within the page template 402. Hence, the generated page includes various "content regions" presenting one or more content items associated with a slot in a location specified by the slot.

A content region 404 may present image data, text, data, a combination of image and text data, or any other information retrieved from a corresponding content item. For example, in FIG. 4, the content region 404A represents a table of contents identifying sections of a digital magazine, and content associated with the various sections are presented in content regions 404B-404H. For example, content region 404A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 4, the content region 404H includes a content item associated with a newspaper to indicate a section including content items retrieved from the newspaper. When a user interacts with the content region 404, a page template associated with the section is retrieved, as well as content items associated with the section. Based on the page template associated with the section and the content items, the digital magazine server 140 generates a page presenting the content items based on the layout described by the slots of the page template. For example, in FIG. 4, the section page 406 includes content regions 408, 410, 412 presenting content items associated with the section. The content regions 408, 410, 412 may include content items associated with various subsections including content items having one or more common characteristics (e.g., topics, authors, etc.). Hence, a subsection may include one or more subsections, allowing hierarchical organization and presentation of content items by a digital magazine.

Retrieving Digital Magazine Content Prior to Loss of Network Connectivity

Figure 5:
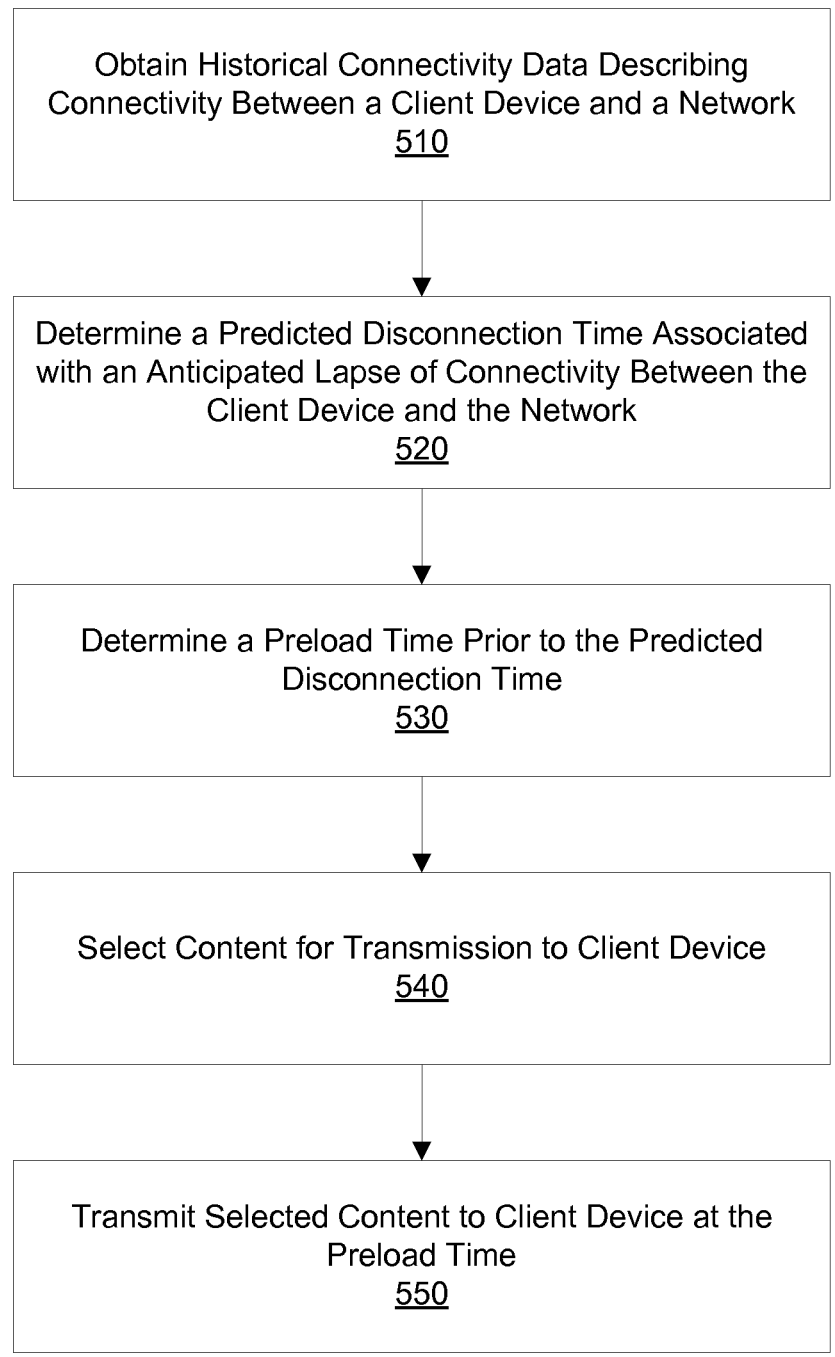
FIG. 5 is a flowchart of a method for providing digital content to a client device, according to one embodiment.

FIG. 5 is a flowchart of one embodiment of a method for providing digital content to a client device. In one embodiment, the steps of the method are performed by the digital magazine server 140 (e.g., the recommendation engine 235, the connectivity predictor 250), but in other embodiments, any suitable component or combination of components may provide the functionality described in conjunction with FIG. 5. For example, the digital magazine application 435 performs one or more of the steps described in conjunction with FIG. 5. Additionally, in some embodiments, different and/or additional steps than those identified in FIG. 5 may be performed, or the steps identified in FIG. 5 may be performed in different orders in various embodiments.

The digital magazine server 140 obtains 510 historical connectivity data describing connectivity between the client device 130 and a network 120. The historical connectivity data includes times when connectivity characteristics of a connection between the client device 130 and the network 120 did not satisfy one or more conditions, which indicates that a loss of connectivity between the client device 130 and the network 120, as well as geographic locations where the connectivity characteristics of the connection between the client device 130 and the network 120 did not satisfy the one or more conditions. For example, the historical connectivity data identifies times when (and geographic locations where) a connection between the client device 130 and the network 120 had less than a threshold bandwidth (e.g., a download bandwidth), when a connection between the client device 130 and network 120 is not a particular type of connection (e.g., wireless local area network), when the reliability of the connection between the client device 130 and network 120 is less than a threshold reliability, or a combination thereof.

In some embodiments, the historical connectivity data identifies losses of connectivity between the client device 130 and the network 120 based on user preferences. The client device 130 maintains user preferences specifying conditions on connectivity characteristics of a connection between the client device 130 and a network 120. Based on the user preferences, the client device 130 generates the historical connectivity data identifying times, and optionally geographical locations, when the connection between the client device 130 and the network 120 did not satisfy at least a threshold number of conditions specified by the user preferences. For example, the user device 130 is configured to deny the digital magazine application 435 from accessing cellular networks, so a loss of connectivity occurs when the type of connection between the client device 130 and the network 120 indicates the client device 130 is communicating with a cellular network. In some embodiments, the obtained historical connectivity data describes connectivity characteristics associated with a connection between the client device 130 and the network 120 as a function of time. For example, the historical connectivity data indicates bandwidth associated with the connection between the client device 130 and a network 120 at various points in time, with a bandwidth of zero indicating no connection between the client device 130 and the network 120.

The obtained historical connectivity data may identify additional geographic locations where losses of connectivity occurred between additional client devices 130 and the network 120. For example, the historical connectivity data identifies geographic boundaries where connectivity characteristics of connections between additional client devices 130 and a network 120 did not satisfy certain conditions during prior time intervals. Such historical connectivity data identifying geographic locations where additional client devices 130 lost connectivity with the network are aggregated and anonymized to protect the privacy of users associated with the additional client devices 130. In some embodiments, historical connectivity data is aggregated for multiple client devices 130 by the digital magazine server 140 based on the interactions of the multiple client devices 130 with the digital magazine server 140. Historical connectivity data may include information about the source or path of connectivity (e.g., wireless access point, network carrier, service provider) for the multiple client devices 130. Such connectivity data may be aggregated by the source or path of connectivity as different carriers may provide different connectivity in different geographical locations. In some embodiments, historical connectivity data is obtained 510 from one or more carriers or other entities providing access to a network 120, with the carriers providing historical connectivity data for additional client devices 130 using the carriers to access one or more networks 120. Hence, historical connectivity data obtained 510 the client device 130 may also include historical connectivity data from additional client devices 130 accessing one or more networks 120 using a common carrier as the client device 130.

Based at least in part on the historical connectivity data, the digital magazine server 140 determines 520 a predicted disconnection time associated with an anticipated loss of connectivity between the client device 130 and the network 120. If the historical connectivity data identifies times when the client device 130 lost connectivity with the network 120, the digital magazine server 140 determines 520 the predicted disconnection time based on losses of connectivity between the client device 130 and the network 120 within a time range in various embodiments. The time range may be periodic, such as a daily, weekly, monthly, yearly, or a portion of a day, or may be a specific time range (e.g., a specific day such as a holiday or a specific range of times). The digital magazine server 140 selects a subset of times occurring within the time range. For example, the selected subset of times includes times between 3 pm and 6 pm on weekday afternoons when a loss of connectivity between the client device 130 and the network 120 occurred. The selected subset of identified times are ranked (e.g., in a percentile ranking), and the predicted disconnection time associated with the anticipated loss of connectivity is determined 520 based on the ranking. For example, the predicted disconnection time is a time (e.g., 5 pm) after which a threshold percentage (e.g., fifty percent) of losses of connectivity between the client device 130 and the network 120 occur within the selected subset of times.

If the historical connectivity data describes connectivity characteristics as a function of time, the digital magazine server 140 determines 520 the predicted disconnection time based on connectivity characteristics from the historical connectivity data. In various embodiments, the digital magazine server 140 determines a measure of central tendency (e.g., an average) of a connectivity characteristic during times within the time range and determines 520 the predicted disconnection time based on the measure of central tendency of the connectivity characteristic. For example, the digital magazine server 140 determines 520 the predicted disconnection time as a time when the measure of central tendency of the connection characteristic (e.g., average bandwidth) is less than a threshold value (e.g., a threshold bandwidth).

Also based on the historical connectivity data, the digital magazine server 140 determines 530 a preload time that occurs prior to the predicted disconnection time. In some embodiments, the digital magazine server 140 determines 530 the preload time based on the predicted disconnection time. For example, the predicted disconnection time is determined 530 as a specified duration of time (e.g., fifteen minutes) before the predicted disconnection time. The specified duration of time may be predetermined or dynamically determined based on connectivity characteristics of a connection between the client device 130 and the network 120 or estimated connectivity characteristics between the client device 130 and the network 120. In some embodiments, the specified duration of time may also be based at least in part on an amount of storage available on the client device 130 or a size of content to be communicated from the digital magazine server 140 to the client device 130. Alternatively, the preload time is determined 530 based on a percentile ranking of times when a loss of connectivity occurs between the client device 130 and the digital magazine server 140. For example, the predicted disconnection time is the time after which eighty-five percent of losses of connectivity occur, and the preload time is the time after which ninety percent of losses of connectivity occur. In other embodiments, the preload time is determined 530 based on a request from the client device 130. For example, the preload time is determined 530 to be a time when the digital magazine server 140 receives a request for content from a digital magazine application 335 executing on the client device 130.

If the historical connectivity data identifies geographic locations where losses of connectivity between one or more client devices 130 and the network 120 occurred, the digital magazine server 140 may determine 530 the preload time based on a current geographic location of the client device 130 and the geographic locations where the losses of connectivity occurred. In such an implementation, the digital magazine server 140 receives a current geographic location of the client device 130. For example, the digital magazine application 335 on the client device 130 is configured to periodically report a geographic location to the digital magazine server 140. As another example, the digital magazine application 335 on the client device 130 communicates a geographic location of the client device 130 to the digital magazine server 140 when one or more conditions are satisfied (e.g., when a cellular tower or wireless access point used by the client device 130 to connect to the network 120 changes, when a type of connection between the client device 130 and the network 120 changes). Based on the geographic locations of the client device 130 and the geographic locations where losses of connectivity have occurred, the digital magazine server 140 determines 530 the preload time as a time when the current geographic location of the client device 130 is within a threshold distance of a geographic location associated with one or more losses of connectivity (e.g., a geographic location associated with at least a threshold number of losses of connectivity). For example, the geographic location associated with the one or more losses of connectivity is a geographic location where a connection between the client device 130 and the network 120 had less than a threshold bandwidth, where a connection between another client device 130 and the network 120 had less than a threshold bandwidth, or where connections client devices 130 having at least a threshold number of attributes (e.g., carrier providing access to the network 120, antenna type) matching attributes of the client device 130 and the network 120 had less than a threshold bandwidth. The threshold distance from the geographic location associated with the one or more losses of connectivity may be predetermined or may be determined based at least in part on a rate at which the geographic location associated with the client device 130 changes (i.e., a speed of the client device 130). In some embodiments, the threshold distance is directly related to the speed of the client device 130. For example, the threshold distance when the client device 130 is traveling at fifty miles per hour is greater than the threshold distance when the client device 130 is traveling at two miles per hour.

The digital magazine server 140 selects 540 content for transmission to the client device 130. In some embodiment, the digital magazine server 140 selects 540 the content at a time that is a specified time interval before the preload time. The digital magazine server 140 may select 540 the content based on attributes (e.g., type, source 110, subject matter) of other content the user has requested at prior times when a loss of connectivity occurred between the client device 130 and the network, or within a threshold interval of one or more of the prior times when a loss of connection between the client device 130 and the network 120 occurred. The digital magazine server 140 obtains content requests received from the client device 130 at one or more prior times when there was a loss of connectivity between the client device 130 and the network 120. For example, the obtained content requests occurred within a threshold time interval of one or more prior times when a connection between the client device 130 and the network 120 had less than a threshold bandwidth. The digital magazine server 140 determines one or more attributes of content associated with at least a threshold number of the obtained content requests and selects 540 additional content associated with at least a threshold number of attributes matching the determined one or more attributes. For example, a client device 130 often requests content describing snow conditions on Friday afternoons after leaving a connection to the network 120 via a wireless access point at a specific location (e.g., a workplace), so the digital magazine server 140 selects 540 other content describing snow conditions at a preload time.

The content may be selected 540 by the digital magazine server 140 based on inclusion in a section of the digital magazine associated with other content the user previously requested at times when a loss of connectivity between the client device 130 and the network 120 occurred. For example, the digital magazine application 335 identifies one or more sections of the digital magazine associated with content previously requested from the digital magazine server 140 within a threshold interval of one or more times associated with a loss of connectivity between the client device 130 and the network 120. The digital magazine server 140 generates a ranking of the identified one or more sections based at least in part on a frequency with which each of the identified one or more sections were requested from the digital magazine server 140 within the threshold interval of the one or more times associated with a loss of connectivity between the client device 130 and the network 120. Based at least in part on the ranking, the digital magazine server 140 selects 540 one or more sections. For example, sections having at least a threshold position in the ranking (e.g., within the top three positions in the ranking) are selected 540 for transmission to the client device 130.

In some embodiments, the selected content depends at least in part on an estimated amount of content to be transmitted before the predicted disconnection time. Based on the historical connectivity data, the digital magazine server 140 determines an estimated bandwidth during a time interval between the preload time and the predicted disconnection time. For example, the estimated bandwidth is determined based on historical connectivity data received from the current geographic location of the client device 130. Temporal data from the historical connectivity data may also be used to determine the estimated bandwidth; for example, available bandwidth within a time interval of the current time on earlier dates is used to determine the estimated bandwidth available at the current time on a current date. The amount of content selected 540 is determined based at least in part on the estimated bandwidth and the time interval between the preload time and the predicted disconnection time. For example, the product of the estimated bandwidth and the amount of time indicates the estimated size of content (e.g., in megabytes) capable of being transmitted before the predicted disconnection time, so the digital magazine server 140 selects content so that the total size of the selected content does not exceed the estimated size. The amount of content may be determined based at least in part on an amount of available storage on the client device 130. For example, the digital magazine server 140 receives information from the client device 130 identifying an amount of available storage on the client device 130 as part of a request for content. The digital magazine server 140 selects 540 content so a total size of the selected content is within a threshold amount of the determined amount of available storage on the client device 130 without exceeding the determined amount of available storage on the client device 130. For example, the digital magazine server 140 selects 540 text content and not image and video content when the determined amount of content is less than a threshold data size (e.g., 0.5 megabytes).

At the determined preload time, the digital magazine server 140 transmits 550 the selected content to the client device 130. In some embodiments, the digital magazine server 140 automatically transmits 550 the selected content to the client device 130 at the preload time. Alternatively, at the determined preload time, the digital magazine server 140 communicates a notification to the client device 130 for presentation to the user at the preload time. If the digital magazine server 140 receives a request for content, which may be in response to the notification presented to the user, the digital magazine server 140 transmits 550 the selected content to the client device 130. The notification may be presented to the user through the digital magazine application 335, through a notification framework provided by the operating system of the client device 130, or through any suitable communication channel. Alternatively or additionally, the digital magazine server 140 transmits the preload time for storage by the client device 130, and the digital magazine application 335 generates and presents the notification at the preload time. The notification prompts the user of the client device 130 to request content. If the user responds to the notification by requesting content, the client device 130 transmits the request for content to the digital magazine server 140, which transmits 550 the content to the client 130 in response to receiving the request.

In some embodiments, the user may configure a preload setting stored by the digital magazine server 140 through the digital magazine application 335, and the digital magazine server 140 transmits 550 the selected content to the client device 130 based on the preload setting. The preload setting is transmitted to by the digital magazine application 335 the digital magazine server 140 and stored in a user profile associated with the user of the client device 130. In one embodiment, the preload setting identifies a preload time to transmit 550 selected content to the client device 130. For example, the preload time is a specific time of day on multiple days (e.g., 9:00 AM on weekdays); in some implementations, the preload setting specifies a range of times on one or more days (e.g., between 8:00 AM and 8:25 AM on weekdays). As another example, the preload setting identifies a preload time by specifying an amount of time prior to a predicted disconnection time. The preload setting may identify attributes of content or sections associated with content, which the digital magazine server 140 uses to select 540 the content for transmission.

Figure 6:
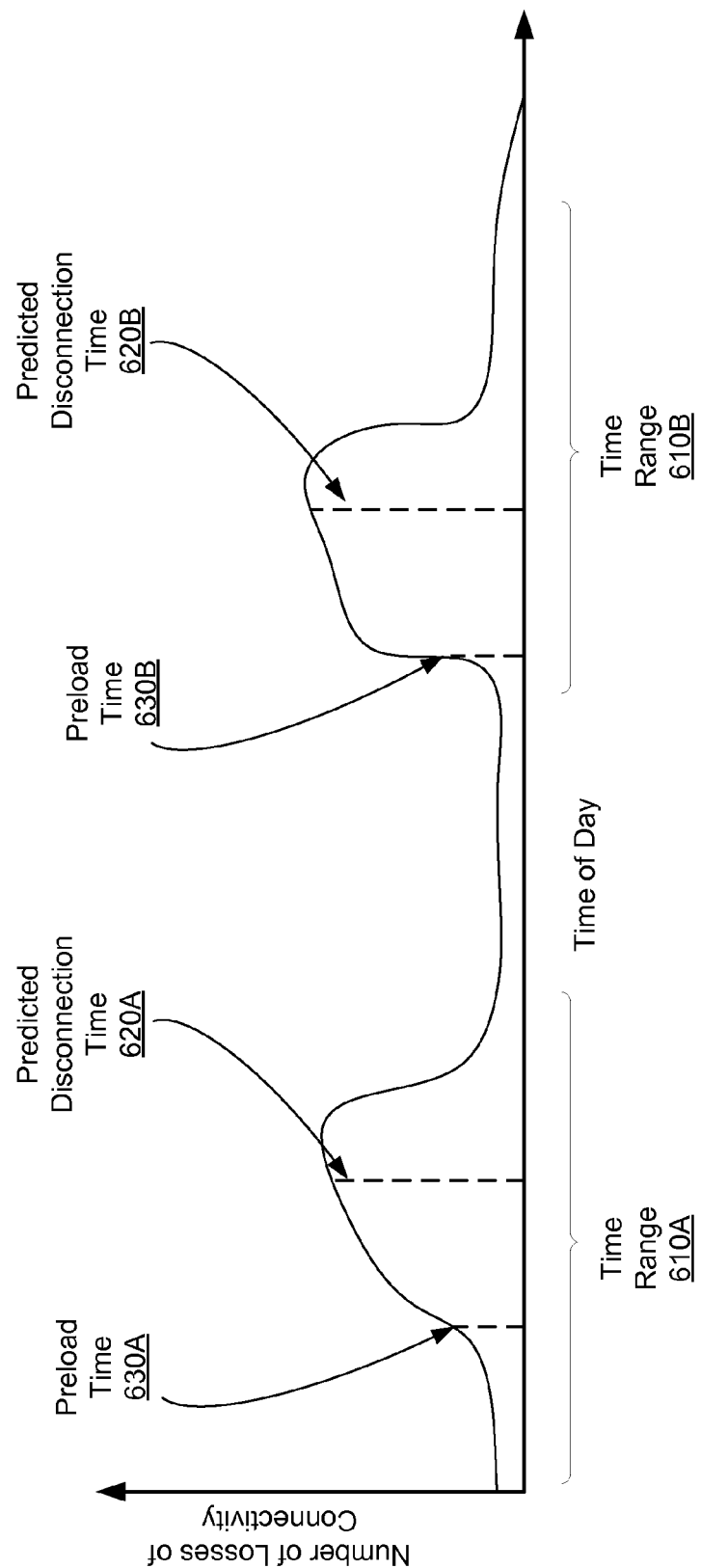
FIG. 6 is a conceptual diagram illustrating determination of a preload time and a predicted disconnection time, according to one embodiment.

FIG. 6 is a conceptual diagram illustrating determination of a preload time and a predicted disconnection time. In the example of FIG. 6, the digital magazine server 140 determines a number of losses of connectivity between a client device 130 and a network 120 (e.g., when a bandwidth of a connection between the client device 130 and the network 130 is below a threshold bandwidth) during different time periods within a day. For example, the time periods are ten-minute intervals throughout the day. In the example of FIG. 6, two periods of the day are associated with losses of connectivity, which may correspond to a morning commute and an evening commute.

To determine preload times, a digital magazine server 140 analyzes subsets of the historical connectivity data. In the example of FIG. 6, two subsets of historical connectivity data from two time ranges 610A, 610B (e.g., morning and evening) are identified. Losses of connectivity within a time range 610A are ranked, and a predicted disconnection time 620A for the time range 610A is determined based on the ranking. For example, the predicted disconnection time 620A is a time after which a threshold percentage (e.g., fifty percent) of losses of connectivity within the time range 610A occur. Similarly, a predicted disconnection time 620B of the other time range 610B is determined by ranking losses of connectivity within the other time range 610B and identifying a time after which a threshold percentage of losses of connectivity within the other time range 610B occur. Based on the predicted disconnection times 620A, 620B, preload times 630A, 630B are determined. For example, a preload time 630A, 630B is a specified length of time (e.g., one hour) prior to a predicted disconnection time 630A, 630B. Alternatively, the preload times 630A, 630B are determined based on a ranking of losses of connectivity within a time range. For example, a preload time 630A, 630B is a time in a time range 610A, 610B after which ninety-five percent of losses of connectivity within the time range 610A, 610B occur.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for providing digital content to a client device, the method comprising:
   obtaining historical connectivity data describing connectivity between the client device and a network, the historical connectivity data identifying geographic locations of the client device where connectivity between the client device and the network had less than a threshold bandwidth;
   determining a predicted disconnection time associated with an anticipated loss of connectivity between the client device and the network based at least in part on the historical connectivity data;
   receiving a current geographic location of the client device;
   determining a preload time occurring prior to the predicted disconnection time based at least in part on the historical connectivity data, the preload time determined as a time when the current geographic location of the client device is within a threshold distance of a geographic location of the client device identified by the historical connectivity data where connectivity between the client device and the network had less than the threshold bandwidth;
   selecting content for transmission to the client device; and
   transmitting the selected content to the client device at the determined preload time.

2. The method of claim 1, wherein the historical connectivity data identifies times when a connection between the client device and the network had less than a threshold bandwidth.

3. The method of claim 2, wherein determining the predicted disconnection time comprises:
   selecting a subset of the identified times occurring within a time range; and
   determining the predicted disconnection time associated with the anticipated loss of connectivity based on a percentile ranking of the selected subset of the identified times.

4. The method of claim 1, wherein the historical connectivity data includes bandwidths associated with a connection between the client device and the network at different time periods.

5. The method of claim 1, wherein the historical connectivity data identifies geographic locations where one or more additional connections between one or more additional client devices and the network had less than the threshold bandwidth.

6. The method of claim 1, wherein selecting content for transmission to the client device comprises:
   obtaining content requests received from the client device at times from the historical connectivity data associated with one or more times when a connection between the client device and the network had less than a threshold bandwidth;
   determining one or more attributes of content associated with at least a threshold number of the obtained content requests; and
   selecting additional content associated with at least a threshold number of attributes matching the determined one or more attributes.

7. The method of claim 1, wherein selecting content for transmission to the client device comprises:
   determining an estimated bandwidth during a time interval between the preload time and the predicted disconnection time based on the historical connectivity data;
   determining an amount of content based at least in part on the estimated bandwidth and the time interval between the preload time and the predicted disconnection time; and
   selecting content so a total size of the selected content is within a threshold amount of the determined amount of content.

8. The method of claim 1, wherein transmitting the selected content to the client device comprises:
   transmitting a notification to the client device at the preload time, the notification prompting a user of the client device to request content; and
   transmitting the selected content to the client device responsive to receiving a request from the client device for content.

9. The method of claim 1, wherein transmitting the selected content to the client device comprises:
   transmitting a request to configure a preload setting to the client device identifying the preload time;
   receiving the preload setting from the client device specifying a time interval before the anticipated loss of connectivity between the client device and the network; and
   transmitting the selected content to the client device based on the received preload setting.

10. The method of claim 1, further comprising:
    transmitting the determined preload time to the client device for storage by the client device.

11. A method for providing digital content to a client device, the method comprising:
    obtaining historical connectivity information describing connectivity between the client device and a network, the historical connectivity data identifying geographic locations of the client device where connectivity between the client device and the network had less than a threshold bandwidth;
    determining a time associated with an anticipated loss of connectivity between the client device and the network based at least in part on the historical connectivity data;
    receiving a current geographic location of the client device;
    determining a preload time occurring prior to the predicted disconnection time based at least in part on the historical connectivity data the preload time determined as a time when the current geographic location of the client device is within a threshold distance of a geographic location of the client device identified by the historical connectivity data where the connectivity between the client device and the network had less than the threshold bandwidth;
    selecting a section of a digital magazine to request from a digital magazine server;
    transmitting to the digital magazine server a request identifying the selected section of the digital magazine and the preload time; and
    receiving digital content from the selected section of the digital magazine from the digital magazine server at the preload time.

12. The method of claim 11, wherein obtaining the historical connectivity information describing connectivity between the client device and the network comprises:
    identifying times when a connection between the client device and the network had less than a threshold bandwidth.

13. The method of claim 12, wherein determining the predicted disconnection time comprises:

selecting a subset of the identified times occurring within a periodic time range; and determining the time associated with the anticipated loss of connectivity based on a percentile ranking of the selected subset of the identified times.

14. The method of claim 11, wherein selecting the section of the digital magazine to request from the digital magazine server comprises:

identifying one or more of sections of the digital magazine associated with content requested from the digital magazine server within a threshold interval of times associated with times when the connection between the client device and the network had less than the threshold bandwidth; and generating a ranking of the identified one or more sections based at least in part on a frequency with which each of the identified one or more sections were requested from the digital magazine server within the threshold interval of times associated with times when the connection between the client device and the network had less than the threshold bandwidth;

determining the selected section of the digital magazine based at least in part on the ranking.

15. The method of claim 11, wherein the request for the selected section includes information identifying an amount of available storage for content associated with the selected section.

16. The method of claim 11, wherein transmitting the request for the selected section of the digital magazine comprises:

presenting a notification to a user of the client device within a threshold interval of the preload time, the notification prompting the user to request content; and transmitting the request for the selected section to the digital magazine server in response to a user interaction with the client device.

* * * * *